(12) United States Patent
Wall

(10) Patent No.: US 6,994,796 B2
(45) Date of Patent: Feb. 7, 2006

(54) METHOD OF REMOVING FILTER FROM FILTER CAP

(75) Inventor: John W. Wall, Holly Springs, NC (US)

(73) Assignee: Purolator Products NA, LLC, Troy, MI (US)

( * ) Notice: Subject to any disclaimer, the term of this patent is extended or adjusted under 35 U.S.C. 154(b) by 17 days.

(21) Appl. No.: 10/790,292

(22) Filed: Mar. 1, 2004

(65) Prior Publication Data

US 2004/0164015 A1 Aug. 26, 2004

Related U.S. Application Data

(62) Division of application No. 10/102,132, filed on Mar. 20, 2002, now Pat. No. 6,770,196.

(51) Int. Cl.
*B01D 35/34* (2006.01)

(52) U.S. Cl. .................................. 210/791; 29/426.5

(58) Field of Classification Search ............. 210/232, 210/238, 437, 440, 443, 444, 455, 457, 470, 210/767, 791; 29/426.5, 426.6, 426.1
See application file for complete search history.

(56) References Cited

U.S. PATENT DOCUMENTS

| | | | | |
|---|---|---|---|---|
| 1,761,924 A | * | 6/1930 | Kamrath | 210/443 |
| 3,400,821 A | | 9/1968 | Singleton | |
| 4,388,086 A | * | 6/1983 | Bauer et al. | 95/118 |
| 4,497,706 A | | 2/1985 | Pickett et al. | |
| 4,764,275 A | | 8/1988 | Robichaud | |
| 4,820,409 A | | 4/1989 | Lowsky et al. | |
| 5,215,658 A | | 6/1993 | Luby | |
| 5,637,215 A | | 6/1997 | Albers, Jr. | |
| 5,783,076 A | | 7/1998 | Albers, Jr. | |

FOREIGN PATENT DOCUMENTS

| | | |
|---|---|---|
| FR | 982524 | 6/1951 |
| SU | 197709 | 9/1997 |

* cited by examiner

*Primary Examiner*—Matthew O. Savage
(74) *Attorney, Agent, or Firm*—Barnes & Thornburg LLP

(57) ABSTRACT

A filter assembly includes a filter cap having a filter chamber defined therein. The filter cap includes a side wall having an opening defined therein. A fluid filter is positioned in the filter chamber. A spring-loaded detent button is movably secured to the filter cap and extends into the filter chamber. When the detent button is depressed by a user, the end of the detent button positioned in the filter chamber contacts the fluid filter thereby releasing the fluid filter from the filter cap. An associated method for replacing a fluid filter is also disclosed.

17 Claims, 5 Drawing Sheets

METHOD OF REMOVING FILTER FROM FILTER CAP

This application is a divisional of U.S. patent application Ser. No. 10/102,132 which was filed on Mar. 20, 2002, now U.S. Pat. No. 6,770,196, and is hereby incorporated by reference herein.

BACKGROUND

The present invention relates to filters for filtering fluids in a work apparatus such as an internal combustion engine, and more particularly to an apparatus and method for releasing an filter assembly from a filter cap of a filter assembly.

Certain fluid filtering assemblies include a replaceable filter element that is housed within a housing that is secured to an internal combustion engine. Typically, a bottom portion of the housing is secured to, or integral with, the engine block. A top portion of the housing, or filter cap, is detachable from the bottom portion of the housing to allow the filter element to be replaced when it has met its useful service life.

One problem associated with the replacement of the filter element is the removal of the filter element from the filter cap. For example, it is often necessary to forcibly remove the filter element from the filter cap. Such forcible removal may be performed by hand or by a potentially destructive manner such as by the use of a screwdriver or pair of pliers. Moreover, in certain cases where the filter element cannot be readily removed from the filter cap, both the filter element and the cap are discarded thereby frustrating certain of the advantages relating to the use of an environmental filter (e.g., the reusability of the filter cap).

Such difficulty in the removal of the filter element also leads to other complications. For example, difficulty in the removal of the filter element tends to cause undesirable fluid dispersion (e.g., oil spillage) during the removal process thereby necessitating cleanup of the work area.

SUMMARY

In accordance with one aspect of the present disclosure, there is provided a filter assembly having a housing with a fluid filter positioned therein. The filter assembly includes an ejection mechanism for ejecting the fluid filter from the housing.

In a more specific illustrative embodiment, there is provided an oil filtering apparatus. The filtering apparatus includes a filter cap having a filter chamber defined therein. The filter cap includes a side wall having an opening defined therein. An oil filter is positioned in the filter chamber. An actuator is movably secured to the filter cap. A portion of the actuator extends through the opening into the filter chamber. In a specific implementation of this illustrative embodiment, the actuator is embodied as a spring-loaded detent button which is secured to the filter cap. When the detent button is depressed by a user, the end of the detent button positioned in the filter chamber contacts a center tube associated with the oil filter thereby ejecting or otherwise urging the center tube (and hence the filter element secured thereto) out of the filter cap.

In another specific exemplary embodiment, there is provided a center tube for use with an oil filter cap which has a detent button operable to release the center tube from the filter cap. The center tube includes a tube body having a number of orifices defined therein. A first end of a post is secured to the tube body. The other end of the post is configured to be contacted by the detent button. In a specific implementation of this exemplary embodiment, the post has a spheroid-shaped member defined therein. The spheroid-shaped member is configured to be contacted by the detent button when the detent button is depressed by a user.

In regard to another exemplary embodiment, there is provided a method of removing an oil filter from a filter cap. The method includes the step of moving an actuator which extends through a side wall of the filter cap so as to exert an ejection force on the oil filter. The method also includes the step of moving the oil filter relative to the side wall in response to the ejection force being exerted on the oil filter.

In another exemplary embodiment, there is provided a filtering apparatus. The filtering apparatus includes a filter cap having a filter chamber defined therein and a fluid filter positioned in the filter chamber. An actuator is movably secured to the filter cap. The actuator is operable to eject the fluid filter from the filter chamber.

The above and other features of the present disclosure will become apparent from the following description and the attached drawings.

BRIEF DESCRIPTION OF THE DRAWINGS

The detailed description particularly refers to the accompanying figures in which.

DETAILED DESCRIPTION OF THE DRAWINGS

Figure 1:
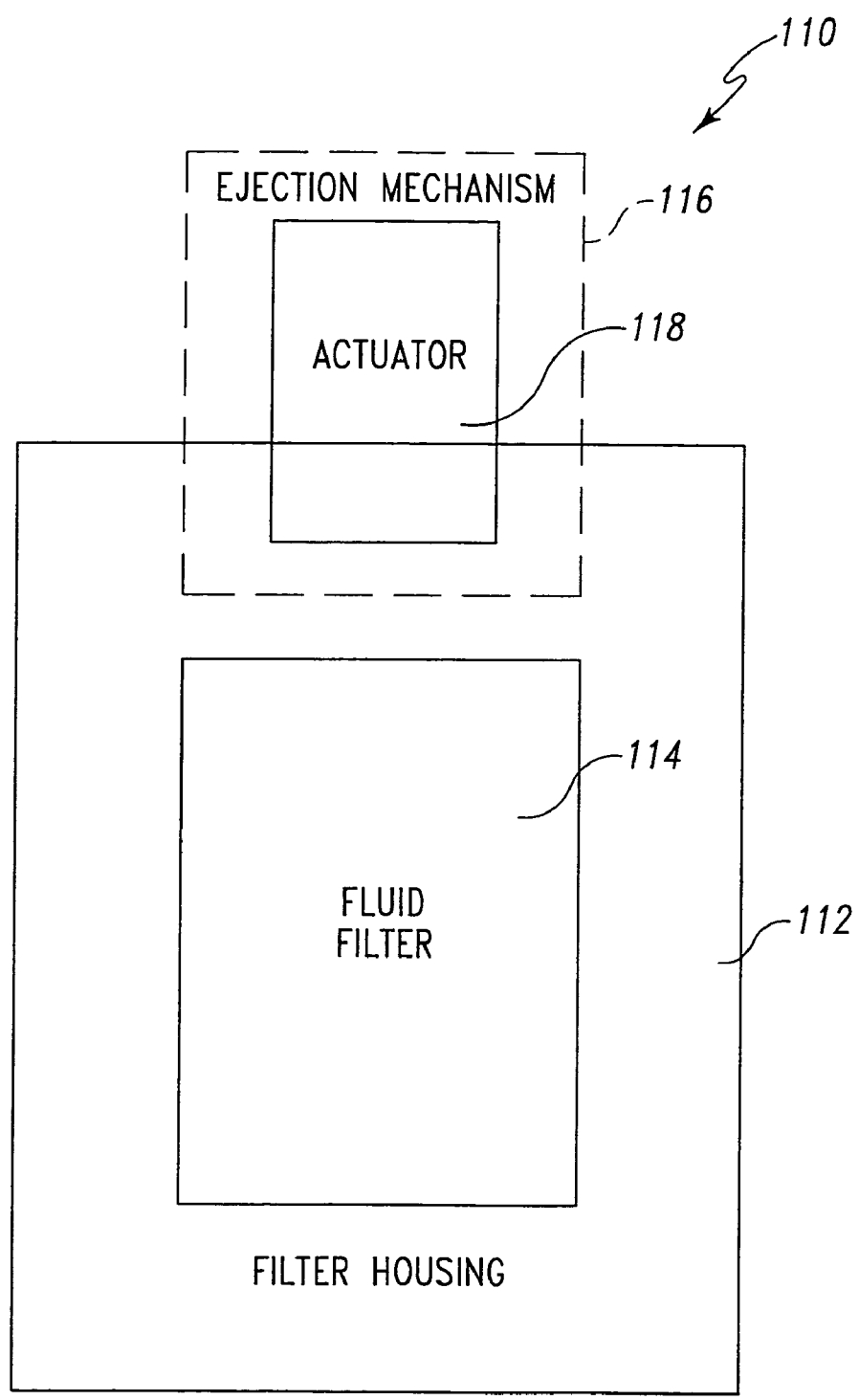
FIG. 1 is a diagrammatic view of a fluid filter assembly.

Referring now to FIG. 1, there is shown a filter assembly 110. The filter assembly 110 includes a housing 112 having a fluid filter 114 positioned therein. The fluid filter 114 may be any type of filter for filtering or otherwise removing particles and debris from fluids. For example, the filter assembly 110 may be embodied as a fuel filter assembly, hydraulic filter assembly, air filter assembly, coolant filter assembly, or oil filter assembly.

The filter assembly 110 includes a filter ejection mechanism 116 for ejecting the fluid filter 114 from the housing 112. The filter ejection mechanism 116 may be embodied as an actuator, 118 which extends through the housing 112 such that, upon actuation thereof by a user, the actuator 118 causes the fluid filter 114 to be ejected or otherwise removed from the housing 112.

Figure 2:
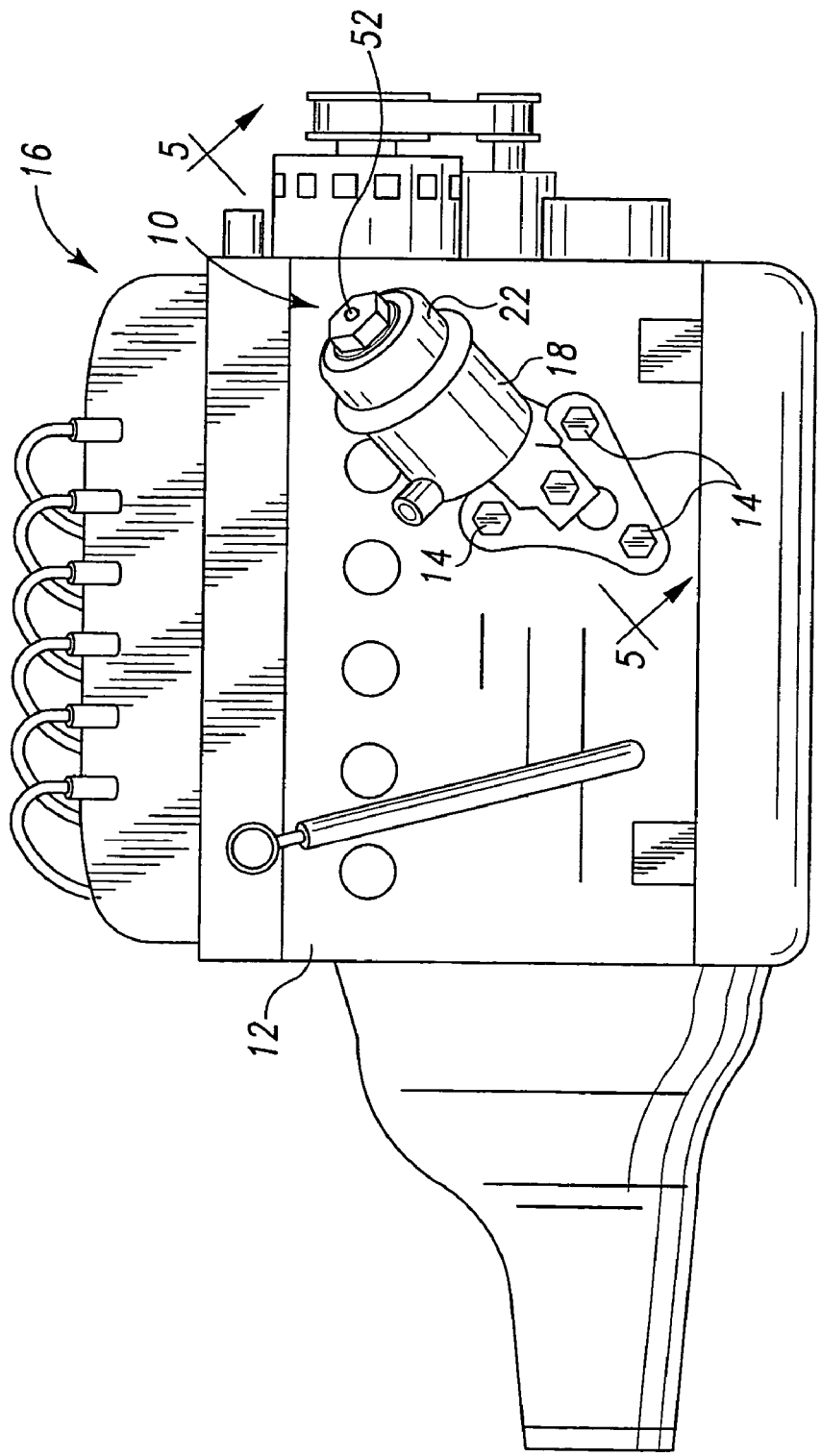
FIG. 2 is a side elevational view of an internal combustion engine which has an oil filter assembly secured to an engine block thereof.

Referring now to FIG. 2, there is shown an exemplary embodiment of the filter assembly 110, namely an oil filter assembly 10. The oil filter assembly 10 is secured to an engine block 12 of an internal combustion engine 16. A number of lag bolts 14 are utilized to secure the oil filter assembly 10 to the engine block 12.

Figure 3:
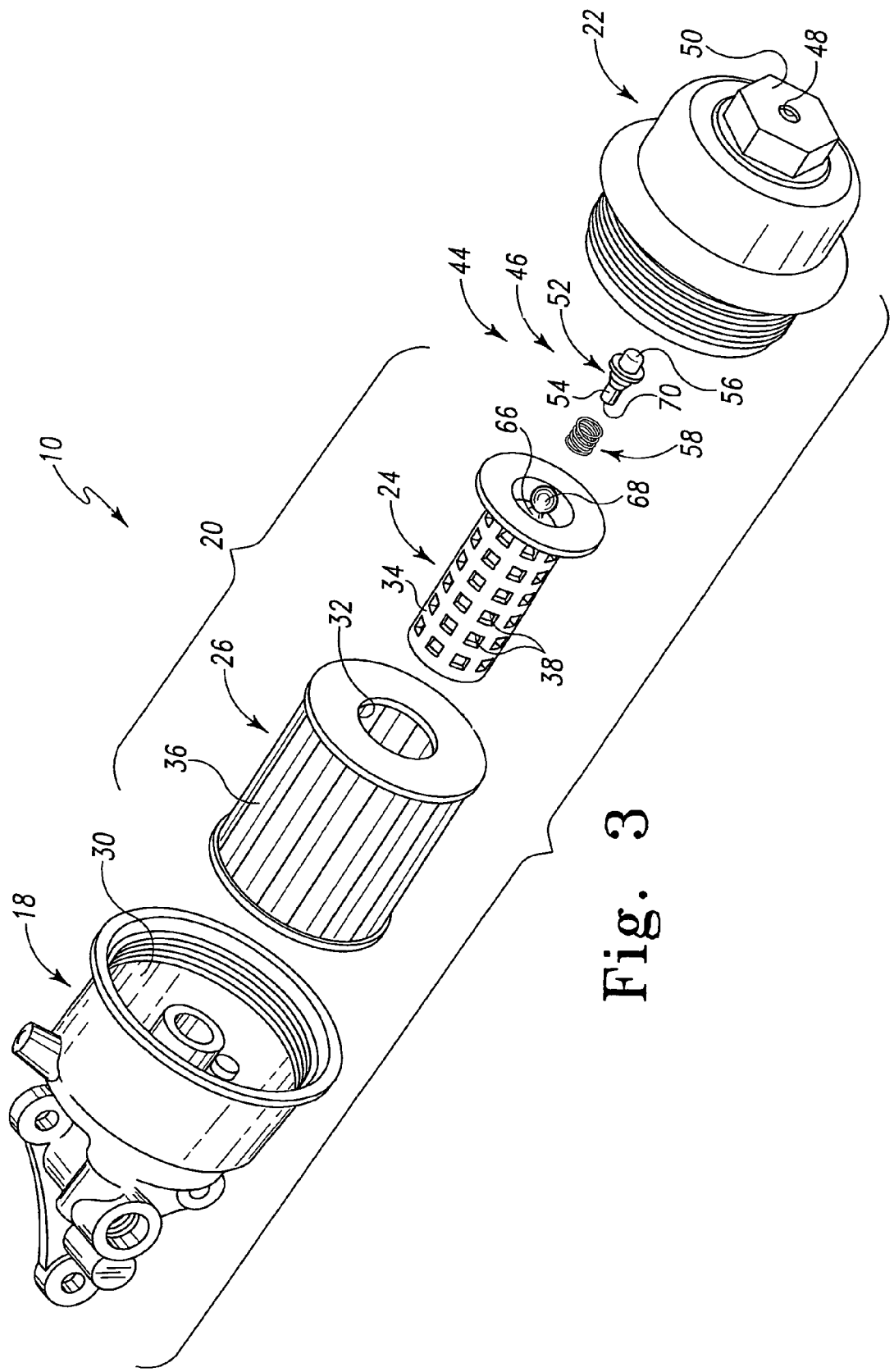
FIG. 3 is an exploded perspective view of the oil filter assembly of FIG. 2.

As shown in FIG. 3, the oil filter assembly 10 includes a housing 18, an oil filter 20, and a filter cap 22. In the illustrative embodiment described herein, the oil filter 20 includes a center tube 24 and a filter element 26. However, it should be appreciated that other embodiments of the oil filter 20 may be utilized in the present invention. For example, a filter having a consolidated tube and filter element design may also be utilized in the present invention.

Figure 5:
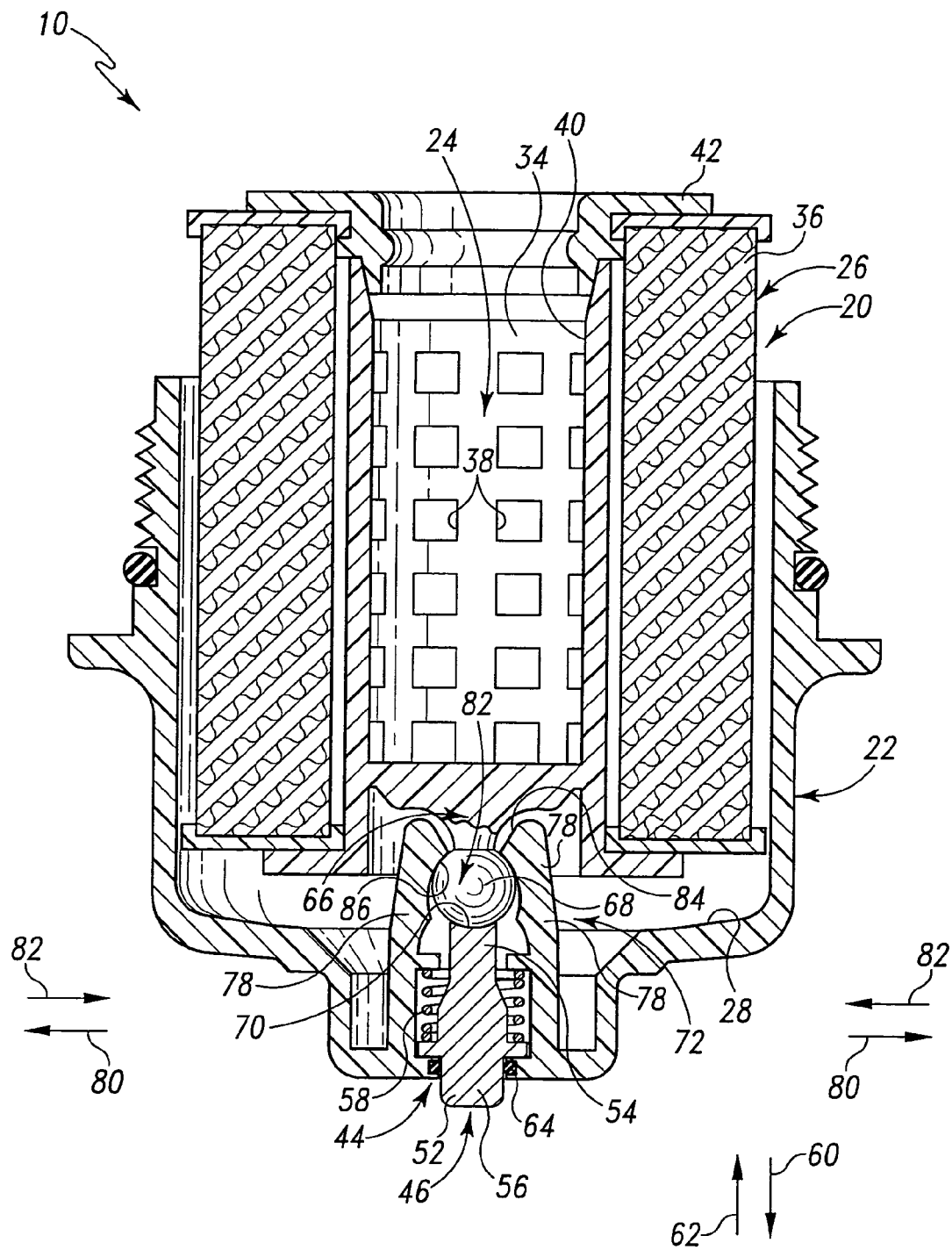
FIG. 5 is a cross sectional view taken along the line 5—5 of FIG. 2, as viewed in the direction of the arrows, note that the spheroid-shaped member of the center tube is not shown in cross section for clarity of description.

The oil filter 20 is positionable within a portion of the filter cap 22. Specifically, as shown in FIG. 5, the oil filter 20 may be releasably secured within a filter chamber 28 defined in the filter cap 22. To do so, as shown in FIGS. 3 and 5, the filter element 26 is first positioned around the center tube 24. Specifically, the filter element 26 is formed to include a tube-receiving channel 32 into which a tube body 34 of the center tube 24 is received. As described below in greater detail, the center tube 24 is releasably secured to the filter cap 22. With the oil filter 20 secured thereto, the filter cap 22 may then be screwed onto the housing 18. In such an arrangement, the oil filter 20 is sealingly housed within the area defined by the filter chamber 28 and a second filter chamber 30 defined in the housing 18.

When the filter cap 22 (with the oil filter 20 secured thereto) is secured to the housing 18 in such a manner, engine oil is advanced through the oil filter 20 during operation of the internal combustion engine 16. Specifically, oil is advanced from the oil pan (not shown) of the engine 16 and into the filter chamber 30 of the housing 18 through an inlet port (not shown) defined in the housing 18. Thereafter, the engine oil surrounds the oil filter 20 and is directed radially inward through a filter medium 36 of the filter element 26 in a direction toward the center tube 24. Such advancement of the oil through the filter medium 36 of the filter element 26 removes contaminants and other impurities from the oil.

After the oil has been advanced through the filter medium 36, the oil flows through a number of orifices 38 defined in the tube body 34 of the center tube 24 and into a central passageway 40 of the center tube 24. Once inside the central passageway 40, the oil is advanced through an outlet port (not shown) of the housing 18 and is thereafter routed back to the engine 16. As shown in FIG. 5, a filter seal 42 may be utilized to seal the oil filter 20 to the housing 18 thereby preventing oil which has not been advanced through the filter medium 36 of the filter element 26 from being advanced back to the engine 16. Hence, as described, engine oil pumped through the oil filter assembly 10 is effectively cleaned during operation of the engine 16.

As shown in FIGS. 3 and 5, the filter cap 22 has a filter ejection mechanism 44 associated therewith. In an exemplary embodiment, the filter ejection mechanism 44 is embodied as an actuator 46 which extends through an opening 48 defined in a side wall 50 into the filter chamber 28 of the filter cap 22. As will be described below in greater detail, the actuator 46 is positionable between an actuated position in which the actuator 46 causes ejection or otherwise allows for release of the oil filter 20 from the filter cap 22 and a non-actuated position in which the actuator 46 does not facilitate removal of the oil filter 20 from the filter cap 22. The actuator 46 may be embodied as any number of different mechanisms which may be utilized to exert a force on the oil filter 20 positioned in the filter chamber 28.

In a specific implementation of this exemplary embodiment, the actuator 46 is embodied as a threadless spring-loaded detent button 52. As shown in FIG. 5, one end portion 54 of the detent button 52 is positioned in the filter chamber 28, whereas the other end portion 56 of the detent button 52 extends out of the opening 48 and is positioned outside of the filter chamber 28. As also shown in FIG. 5, a seal such as an O-ring 64 may be utilized to seal the detent button 52 to the filter cap 22 thereby preventing oil from leaking through the opening 48. A biasing spring 58 may be utilized to maintain the detent button 52 in its non-actuated position. In particular, the biasing spring 58 exerts a bias on the detent button 52 so as to urge the detent button 52 in a direction away from the oil filter 20 (i.e., in the general direction of arrow 60 of FIG. 5). However, when a user depresses the detent button 52 (i.e., exerts a force on the end portion 56 of the detent button 52 in the general direction of arrow 62 of FIG. 5), the bias of the spring 58 is overcome and the detent button 52 is urged in a direction toward the oil filter 20 (i.e., in the general direction of arrow 62 of FIG. 5). As will be described below, such movement of the detent button 52 positions the detent button 52 in its actuated position thereby causing ejection or otherwise allowing for removal of the oil filter 20 from the filter chamber 28 of the filter cap 22.

It should be appreciated that when positioned in its non-actuated position (as depicted in FIG. 5), the detent button 52 may be physically spaced apart from the oil filter 20. In such a case, the detent button 52 does not contact the oil filter 20 until the detent button 52 is moved into contact with the oil filter 20 by depression thereof by the user. Alternatively, the detent button 52 may physically contact the oil filter 20 when the button 52 is positioned in its non-actuated position. In such a configuration, the spring bias exerted on the detent button 52 by the spring 58 does not eject the oil filter 20 from the filter cap 22 prior to external actuation of the detent button 52 by a user.

The detent button 52 may be configured to exert force on any component or feature associated with the oil filter 20 in order to release the filter 20 from the filter chamber 28. For example, the detent button may be configured to exert force on the center tube 24 (in the case in which both the center tube 24 and filter element 26 are removable from the filter cap 22). Alternatively, in the case in which the center tube 24 is not removable from the filter cap 22, the detent button may be configured to exert force on the filter element 26 in order to eject the filter element 26 from the filter cap 22.

For purposes of clarity, the case in which both the center tube 24 and the filter element 26 are removable from the filter cap 22 will herein be described in detail. As such, the center tube 24 of the oil filter 20 is configured to include a feature on which the detent button 52 may bear during depression of the button 52 by the user. In particular, as shown in FIGS. 3 and 5, the center tube 24 has a post 66 extending therefrom. Preferably, the post 66 is integrally molded with the tube body 34. However, the post 66 may alternatively be provided as a separate component which is secured to the tube body 34.

As shown in FIG. 5, the post 66 has a spheroid-shaped member 68 defined therein. The detent button 52 is configured to contact the spheroid-shaped member 68 when the detent button 52 is depressed by a user. Specifically, as shown in FIG. 5, the end portion 54 of the detent button 52 has an arcuate surface 70 defined therein. The arcuate surface 70 substantially conforms to the outer surface of the spheroid-member 68. As such, the force generated by the user depressing the detent button 52 may be effectively transferred to the spheroid-member 68 and hence the center tube 24.

It should be appreciated that the post 66 may be alternatively configured with features other than the spheroid-shaped member 68. For example, the post 66 may have a relatively thin, flat, circular-shaped member (e.g. a "puck") defined therein. Alternatively, numerous other geometric shapes may also be utilized in the construction of the post 66.

As shown in FIG. 5, the post 66 is selectively captured or otherwise retained by a filter retainer 72 associated with the filter cap 22. The filter retainer 72 is operable to releasably secure the oil filter 20 to the filter cap 22. As such, the filter retainer 72 may be embodied as any type of mechanism which is operable to releasably secure the oil filter 20 to the filter cap 22. For example, the filter retainer 72 may be embodied as a number of flanges or fingers, a cavity for receiving a snap-fit member, a number of adhesive or interlocking material strips, or any other type of retaining mechanism. In one exemplary embodiment, the filter retainer 72 is embodied as a number of cantilevered spring arms 76 which are secured at one end to the inner surface of the side wall 50 so as to extend inwardly into the filter chamber 28 from the side wall 50.

The filter retainer 72 is positionable in either a retention position or a release position. When the filter retainer 72 is positioned in its retention position, the spheroid-shaped member 68 of the post 66 is retained or otherwise secured in the filter chamber 28 by the retainer 72. Alternatively, when the filter retainer 72 is positioned in its release position, the spheroid-shaped member 68 (and hence the center tube 24) is freely movable relative to the filter cap 22, and, as such, may be ejected or otherwise removed from the filter chamber 28.

Figure 4:
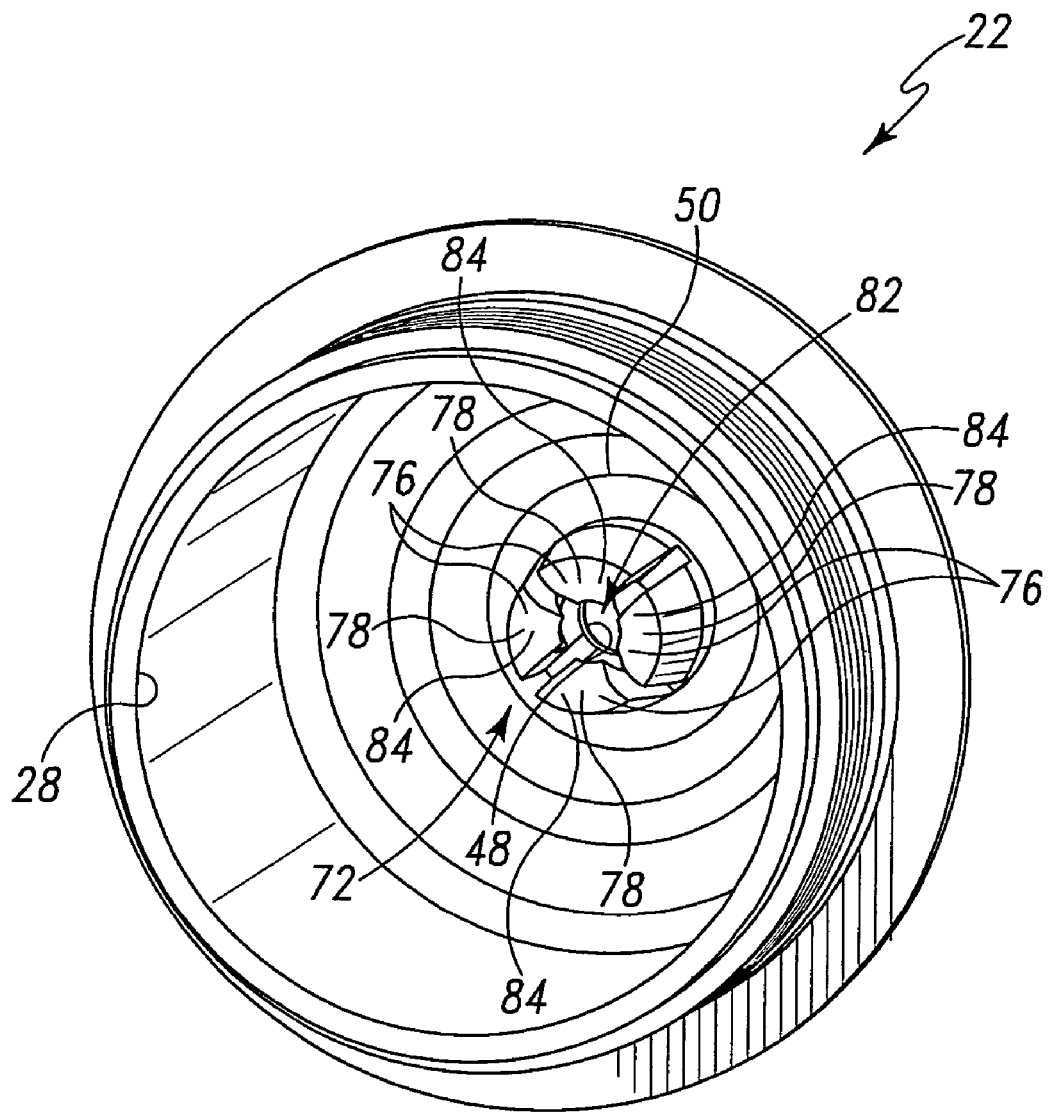
FIG. 4 is perspective view of the filter cap of the oil filter assembly of FIGS. 2 and 3.

In the specific exemplary embodiment in which the retainer 72 is embodied as a plurality of spring arms 76, the spring arms 76 may be deflected or otherwise moved between their respective release positions and retention positions. The spring arms 76 are depicted in their respective retention positions in FIG. 5. If the movable end portions 78 of the spring arms 76 are deflected or otherwise moved away from one another (i.e., in a radially outward direction indicated by arrows 80 of FIG. 5) so as to be positioned in their respective release positions, the spheroid-shaped member 66 is freely movable through a gap 82 defined by the area between the spring arms 76 (see FIG. 4).

In order to create such movement of the spring arms 76, each of the spring arms 76 has a pair of cam surfaces 84, 86 defined therein. Advancement of the spheroid-member 68 of the post 66 into contact with the cam surfaces 84, 86 causes movement of the spring arms 76 between their respective release positions and retention positions. In particular, during insertion of the oil filter 20 into the filter chamber 28 (i.e., movement of the filter 20 in the general direction of arrow 60 of FIG. 5), the spheroid-shaped member 68 is advanced into contact with the cam surfaces 84 of the spring arms 76 thereby urging the spring arms 76 outwardly in a direction away from one another (i.e., in the general direction of arrows 80 of FIG. 5). Once the spheroid-shaped member is advanced beyond the end of the cam surface 84, the spring arms 76 "spring back" or are otherwise moved inwardly in a direction toward one another (i.e., in the general direction of arrows 82 of FIG. 5) thereby capturing the spheroid-shaped member 66 therebetween.

Conversely, during removal (e.g., ejection) of the oil filter 20 from the filter chamber 28 (i.e., movement of the filter 20 in the general direction of arrow 62 of FIG. 5), the spheroid-shaped member 68 is advanced into contact with the cam surfaces 86 of the spring arms 76 thereby urging the spring arms outwardly in a direction away from one another (i.e., in the general direction of arrows 80 of FIG. 5). Once the spheroid-shaped member 68 is advanced beyond the end of the cam surface 86, the spring arms 76 "spring back" or are otherwise moved inwardly in a direction toward one another (i.e., in the general direction of arrows 82 of FIG. 5). Moreover, once the spheroid-shaped member 68 is advanced beyond the end of the cam surface 86, the center tube 24 (and hence the filter element 26 secured thereto) is freely movable relative to the filter cap 22, and, as a result, may be ejected therefrom.

In operation, the oil filter assembly 10 provides for quick and easy replacement of the oil filter 20. To do so, the filter cap 22 is first unscrewed from the housing 22. Once removed from the housing 22, the filter cap 22, with the oil filter 20 secured thereto, is then held over an approved disposal container and the detent button 52 depressed in order to eject the oil filter 20. Specifically, as described in detail above, when a user depresses the detent button 52, the center tube 24 (and hence the filter element 26 secured thereto) is freely movable relative to the filter cap 22. As such, if the filter cap 22 is held in an orientation in which the detent button 52 is positioned upwardly, the center tube 24 and the filter element 26 will fall freely from the filter cap 22 when the user depresses the detent button.

Once the oil filter 20 to be replaced has been removed, a new oil filter 20 may be installed. Specifically, once removed from the filter cap 22, the user may slide the filter element 26 off of the center tube 24 in order to discard the filter element 26 while allowing the center tube 24 to be reused. Alternatively, both the center tube. 24 and the filter element 26 may be discarded, particularly in the case of when the center tube 24 and the filter element 26 are provided as a consolidated component. In any case, the replacement center tube 24 and filter element 26 are then secured to the filter cap 22. Thereafter, the filter cap 22 is screwed back onto the housing 22 thereby completing the filter replacement procedure.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

What is claimed is:

1. A method of removing an oil filter from a filter cap, the oil filter being configured to remove impurities from oil upon passage of the oil through the oil filter comprising the steps of:

removing from a housing of an oil filter assembly said filter cap with said oil filter secured to said filter cap;

moving an actuator which extends through a side wall of said filter cap so as to exert a force on said oil filter after removal of said filter; and moving said oil filter relative to said side wall in response to said force being exerted on said oil filter.

2. The method of claim 1, wherein:

said filter cap has a filter chamber defined therein, said oil filter is positioned in said filter chamber, said actuator comprises a detent button having a first end which is positioned in said filter chamber and a second end which extends out of an opening defined in said side wall, and said step of moving said actuator comprises moving said detent button so as to exert said force on said oil filter with said detent button.

3. The method of claim 2, wherein said step of moving said oil filter comprises ejecting said oil filter from said filter chamber in response to said force being exerted on said oil filter by said detent button.

4. The method of claim 1, wherein said filter cap has a filter retainer secured thereto, further comprising the step of:

moving said filter retainer relative to said side wall from a retention position in which said filter retainer retains said oil filter to a release position in which said oil filter is movable relative to said filter cap in response to said force being exerted on said oil filter.

5. The method of claim 4, wherein:

said oil filter has a post extending therefrom;

said post having a spheroid-shaped member defined thereon;

said step of moving said oil filter comprises exerting said force on said spheroid-shaped member; and said step of moving said filter retainer comprises moving said filter retainer relative to said side wall from the retention position in which said filter retainer retains said spheroid-shaped member to the release position in which said spheroid-shaped member is movable relative to said filter cap in response to said force being exerted on said spheroid-shaped member.

6. The method of claim 1, wherein:

said oil filter has a post extending therefrom;

said post has a spheroid-shaped member defined therein; and said step of moving said actuator comprises moving said actuator against said spheroid-shaped member so as to exert said force on said spheroid-shaped member.

7. The method of claim 6, wherein:

said actuator comprises a detent button; and said step of moving said actuator comprises moving said detent button against said spheroid-shaped member.

8. The method of claim 7, wherein:

said detent button comprises a concave surface;

said spheroid-shaped member comprises a convex surface; and said step of moving said detent button comprises moving said concave surface against said convex surface.

9. The method of claim 1, wherein:

said actuator comprises a detent button; and said step of moving said actuator comprises moving said detent button against a spring.

10. The method of claim 9, further comprising a step of said spring acting against a shoulder of said detent button so as to urge said shoulder away from said oil filter into contact with said side wall.

11. The method of claim 1, wherein said actuator comprises a detent button, further comprising the step of establishing a seal around said detent button with an O-ring.

12. The method of claim 1, wherein:

said actuator comprises a threadless detent button; and said step of moving said actuator comprises moving said threadless detent button through an opening defined in said side wall.

13. A method of removing an oil filter from a filter cap, said oil filter having a post extending therefrom, said filter cap having a plurality of spring arms secured thereto, comprising the steps of:

moving an actuator which extends through a side wall of said filter cap so as to exert a force on said oil filter;

moving said oil filter relative to said side wall in response to said force being exerted on said oil filter; and moving each of said plurality of spring arms from a retention position in which said plurality of spring arms cooperate to retain said post to a release position in which said post is movable relative to said filter cap in response to said force being exerted on said oil filter.

14. The method of claim 13, wherein said step of moving said actuator comprises moving said actuator into contact with said post so as to exert said force on said post.

15. A method of removing an oil filter from a filter cap, said oil filter having a post extending therefrom, said filter cap having a plurality of spring arms secured thereto, said post having a spheroid-shaped member defined thereon, comprising the steps of:

moving an actuator which extends through a side wall of said filter cap so as to exert a force on said oil filter;

urging said spheroid-shaped member into contact with each of said plurality of spring arms; and moving each of said plurality of spring arms from a retention position in which said plurality of spring arms cooperate to retain said spheroid-shaped member to a release position in which said post is movable relative to said filter cap in response to said urging step.

16. The method of claim 15, wherein said step of moving said actuator comprises moving said actuator into contact with said spheroid-shaped member so as to exert said force on said spheroid-shaped member.

17. The method of claim 16, wherein said urging step comprises urging said spheroid-shaped member into contact with each of said plurality of spring arms in response to movement of said actuator into contact with said spheroid-shaped member.

* * * * *